United States Patent
Lee et al.

(10) Patent No.: US 8,283,895 B2
(45) Date of Patent: Oct. 9, 2012

(54) CIRCUIT CURRENT BALANCING METHOD AND APPARATUS FOR BATTERY APPARATUS

(75) Inventors: Dal-Hoon Lee, Daejeon (KR); Eguchi Yasuhito, Ebina (JP); Shoji Tanina, Tokyo (JP); Jee-Ho Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 337 days.

(21) Appl. No.: 12/373,384

(22) PCT Filed: Jul. 13, 2007

(86) PCT No.: PCT/KR2007/003407
§ 371 (c)(1),
(2), (4) Date: Mar. 25, 2009

(87) PCT Pub. No.: WO2008/007924
PCT Pub. Date: Jan. 17, 2008

(65) Prior Publication Data
US 2009/0315514 A1 Dec. 24, 2009

(30) Foreign Application Priority Data
Jul. 13, 2006 (KR) .......................... 10-2006-0066034

(51) Int. Cl.
*H02J 7/00* (2006.01)
(52) U.S. Cl. ........ 320/137; 320/160; 320/162; 320/134; 320/136
(58) Field of Classification Search .................. 320/116, 320/119, 120, 134, 135, 136, 160, 161, 162, 320/137
See application file for complete search history.

(56) References Cited

U.S. PATENT DOCUMENTS

| | | | |
|---|---|---|---|
| 5,557,189 A | | 9/1996 | Suzuki et al. |
| 5,952,815 A | * | 9/1999 | Rouillard et al. ............. 320/116 |
| 6,114,835 A | | 9/2000 | Price |
| 6,160,376 A | * | 12/2000 | Kumar et al. ................. 320/116 |
| 6,181,108 B1 | * | 1/2001 | Sudo et al. ..................... 320/134 |

(Continued)

FOREIGN PATENT DOCUMENTS

| | | |
|---|---|---|
| EP | 0831571 A2 | 3/1998 |
| JP | 2000-312439 A | 11/2000 |
| JP | 2005-151720 A | 6/2005 |
| JP | 2006-129577 A | 5/2006 |
| KR | 10-2006-0073525 A | 6/2006 |

OTHER PUBLICATIONS

Supplementary European Search Report dated Jun. 16, 2011, for Application No. 07768737.4.

*Primary Examiner* — Edward Tso
*Assistant Examiner* — Alexis Boateng
(74) *Attorney, Agent, or Firm* — Birch, Stewart, Kolasch & Birch, LLP

(57) ABSTRACT

A circuit current balancing apparatus balances circuit currents among units of a battery device. The circuit current balancing apparatus is provided with a plurality of cell stacks respectively composed of at least one cell. The apparatus balances a circuit current of a control circuit connected to each of the plurality of cell stacks for controlling and monitoring a status of the cell stack. The apparatus also includes a comparator for calculating and outputting a voltage difference between an output voltage of the corresponding cell stack and a voltage of the control circuit connected to the corresponding cell stack, and a current source for adding or subtract a dummy current to/from a circuit current of the control circuit in correspondence with the output of the comparator.

10 Claims, 6 Drawing Sheets

U.S. PATENT DOCUMENTS

| | | | |
|---|---|---|---|
| 7,397,221 B2 * | 7/2008 | Sakuma et al. | 320/134 |
| 2002/0024319 A1 * | 2/2002 | Haraguchi et al. | 320/122 |
| 2004/0027092 A1 * | 2/2004 | Patel et al. | 320/119 |
| 2004/0257042 A1 | 12/2004 | Liu et al. | |
| 2005/0185361 A1 | 8/2005 | Yano et al. | |
| 2005/0269989 A1 * | 12/2005 | Geren et al. | 320/119 |
| 2006/0022639 A1 | 2/2006 | Moore | |
| 2006/0082343 A1 * | 4/2006 | Sobue et al. | 320/119 |
| 2007/0285054 A1 * | 12/2007 | Li et al. | 320/116 |

* cited by examiner

CIRCUIT CURRENT BALANCING METHOD AND APPARATUS FOR BATTERY APPARATUS

TECHNICAL FIELD

The present invention relates to a battery device, and more particularly to circuit current balancing method and apparatus for balancing circuit currents among units of the battery device.

BACKGROUND ART

Generally, a battery device is configured as shown in FIG. 1.

Referring to FIG. 1, the battery device includes a plurality of battery cell stacks C1~CN, in each of which at least one battery cell is connected in series. The battery cell stacks C1~CN are respectively connected with analog preprocessing circuits A1~AN.

The plurality of analog preprocessing circuits A1~AN play a role of detecting, controlling and regulating voltage and current, and a battery cell connected to one of the analog preprocessing circuits A1~AN may be changed depending on the kind of application.

The analog preprocessing circuits A1~AN are connected with controllers M1~MN that control the battery cell stacks C1~CN, respectively.

Each of the analog preprocessing circuit A1~AN detects voltage and current of each of the battery cell stacks C1~CN and provides it to the corresponding controller M1~MN. Each of the controllers M1~MN recognizes a status of each battery cell such as overvoltage, overcurrent and overdischarge according to the detection result and then turns on/off switching elements CFET, DFET so as to protect the battery device.

In the above battery device, one battery cell stack, one analog preprocessing circuit connected to the battery cell stack, and one controller connected to the analog preprocessing circuit are called 'one unit'.

Assuming that a circuit current flowing along one of a plurality of units provided in the battery device is Icc, a circuit current of a $N^{th}$ unit based on the grounding GND may be called Iccn.

The current flowing on an external load of the battery device passes in the route of CFET→DFET→$N^{th}$ cell stack CN→ . . . →first cell stack→current detection resistance Rshunt, and its direction may be reversed according to charging or discharging.

In the above battery device, circuit currents Icc1, Icc2, . . . , Iccn of the first to $N^{th}$ units are not always kept constantly due to unevenness of a battery cell voltage, unevenness of current in voltage and current detection circuits, and unevenness of circuit currents of the voltage and current detection circuits depending on temperature.

It may be expressed in an equation, as in the following equation 1.

$$Icc1 \neq Icc2 \neq Iccn \qquad \text{Equation 1}$$

As mentioned above, circuit currents of the first to $N^{th}$ units are not identical, and such unevenness of circuit currents gives an influence on a discharging current of a cell stack and thus causes unevenness of discharging currents of the units. It is because the circuit current is added to the discharging current of the battery cell stack.

If this status is kept a long time, residual capacities of the units also become uneven as time goes.

For example, it is assumed that the first battery cell stack C1 has a residual capacity of 50%, the second battery cell stack C2 has a residual capacity of 30%, and the $N^{th}$ battery cell stack CN has a residual capacity of 40%.

If a battery pack is charged with the unevenness of residual capacities of the battery cell stacks, when the first battery cell stack C1 having the greatest residual capacity is fully charged, it is determined that the entire battery device is completely charged. Thus, the unevenness of residual capacities at the beginning of charging is kept as it was.

If the charging is completed in this status, the second battery cell stack C2 has a residual capacity of 80% and the $N^{th}$ battery cell stack CN has a residual capacity of 90%, so they cannot be fully charged.

In addition, the unevenness of circuit currents of the units, namely the unevenness of discharging currents by circuits, also causes unevenness of deterioration of battery cells since all units do not enter an overdischarge area at once for a long-term preservation, but some of them enter the overdischarge area fast but some of them enter the overdischarge area late.

Thus, there has been an urgent need for a technique that allows balancing circuit currents of units in a battery device.

DISCLOSURE

Technical Problem

The present invention is designed to solve the problems of the prior art, and therefore it is an object of the present invention to provide circuit current balancing apparatus and method of a battery device, which may balance circuit currents of units of the battery device.

Technical Solution

In order to accomplish the above object and solve the problems of the prior art, the present invention provides a circuit current balancing apparatus of a battery device provided with a plurality of cell stacks respectively composed of at least one cell, the apparatus balancing a circuit current of a control circuit connected to each of the plurality of cell stacks for controlling and monitoring a status of the cell stack, the apparatus comprising: a comparator for calculating and outputting a voltage difference between an output voltage of the corresponding cell stack and a voltage of the control circuit connected to the corresponding cell stack; and a current source for adding or subtract a dummy current to/from a circuit current of the control circuit in correspondence with the output of the comparator.

In another aspect of the present invention, there is also provided a circuit current balancing method of a battery device provided with a plurality of cell stacks respectively composed of at least one cell, the apparatus balancing a circuit current of a control circuit connected to each of the plurality of cell stacks for controlling and monitoring a status of the cell stack, the method comprising: calculating and outputting a voltage difference between an output voltage of the corresponding cell stack and a voltage of the control circuit connected to the corresponding cell stack; and adding or subtract a dummy current to/from a circuit current of the control circuit in correspondence with the output.

BEST MODE

Figure 1:
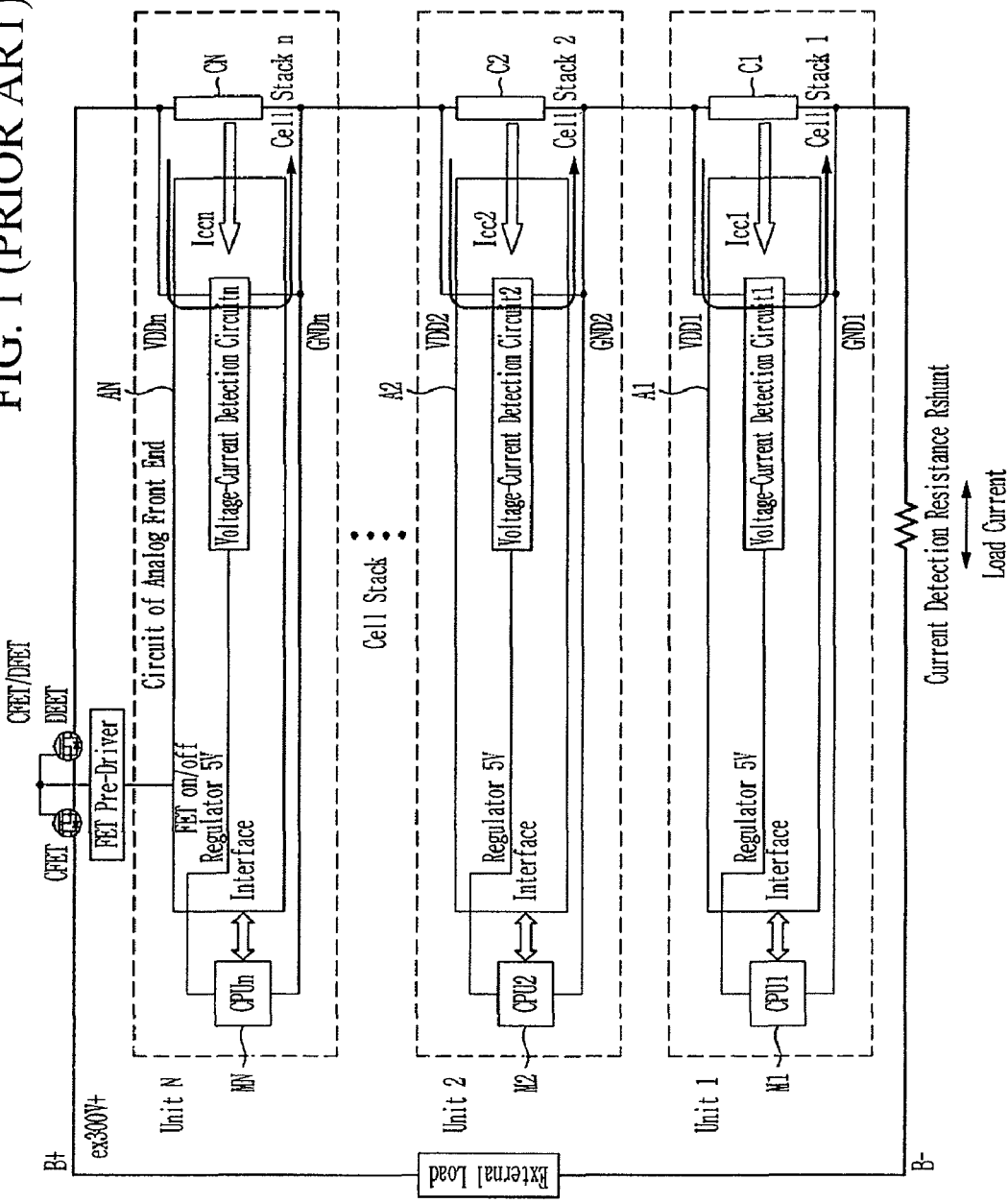
FIG. 1 is a schematic view showing a conventional battery device.
Figure 2:
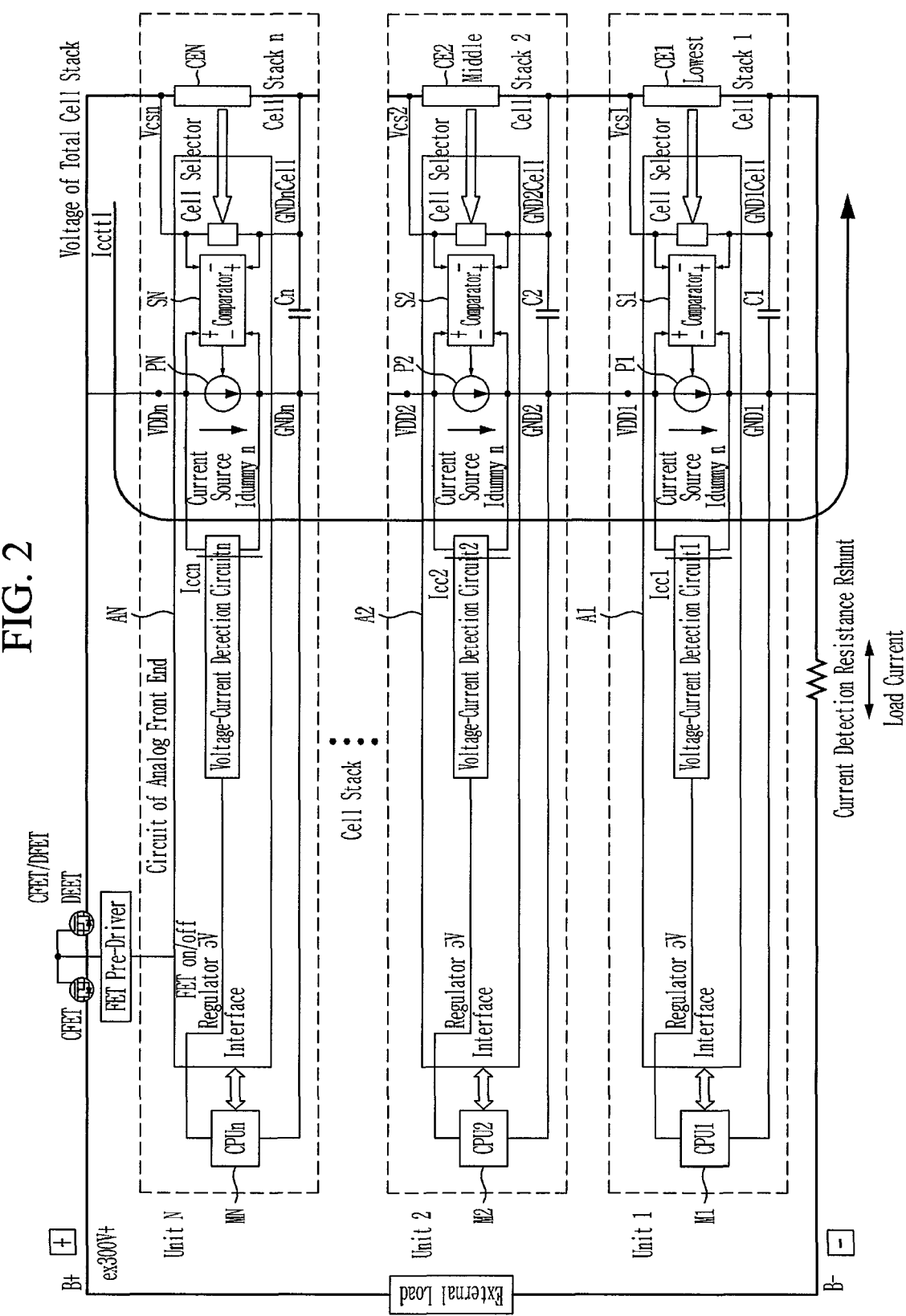
FIG. 2 shows a battery device according to a preferred embodiment of the present invention.

Hereinafter, a circuit current balancing apparatus of a battery device according to the present invention will be explained with reference to FIG. 2. Here, any part of the present invention identical to the conventional battery device will not be described in detail again.

A plurality of battery cells provided in the battery device are grouped by at least ones into first to $N^{th}$ battery cell stacks CE1~CEN. The first to $N^{th}$ battery cell stacks CE1~CEN are respectively connected with first to $N^{th}$ analog preprocessing circuits A1~AN.

The analog preprocessing circuit conducts current detecting, controlling and regulating functions as mentioned above. Here, a battery cell connected to one of the analog preprocessing circuits A1~AN is changeable depending on the kind of application. Also, the analog preprocessing circuit means a circuit connected to each of the plurality of cell stacks to control or monitor a status of the cell stack.

In the present invention, the control circuit is defined to include the analog preprocessing circuit, and it means a circuit taking charges of not only monitoring a status of a cell stack such as current, voltage, resistance and power but also controlling the cell stack. If there is no special mention, the analog preprocessing circuit should be interpreted as one example of the control circuit of the present invention.

Each of the first to $N^{th}$ analog preprocessing circuits A1~AN includes a circuit current balancing apparatus according to a preferred embodiment of the present invention. The circuit current balancing apparatus is composed of comparators S1~SN and current sources P1~PN.

Each of the comparators S1~SN is connected with voltage output terminals of the corresponding battery cell stack. The comparator compares a voltage of any one of the voltage output terminals of the battery cell stack with a voltage of a grounding terminal of the analog preprocessing circuit to which the comparator belongs. As a result, by using a comparison result between a voltage of the other one of the voltage output terminals of the battery cell stack and a voltage of a voltage terminal of the analog preprocessing circuit to which the comparator belongs, the comparator outputs a control voltage to generate a dummy current corresponding to the comparison result.

Each of the current sources P1~PN adds or subtracts the dummy current corresponding to the control voltage output from the comparator S1~SN to/from a circuit current.

That is to say, the current sources P1~PN flow dummy currents Idummy1, Idummy2, . . . , Idummyn to circuit currents Icc1, Icc2, . . . , Iccn of the units as expressed in the following equation 2 such that the units have the same circuit current.

$$Idummy1+Icc1 = Idummy2+Icc2 = Idummyn+ Iccn = Iccttl \text{ (Total Current)} \quad \text{Equation 2}$$

The circuit current balancing apparatuses provided to the first to $N^{th}$ analog preprocessing circuits A1~AN have the same configuration and operation, so only a circuit current balancing apparatus provided to the second analog preprocessing circuit A2 will be explained in detail.

The comparator S2 is composed of first and second comparators CA1, CA2 and first and second adders AD1, AD2.

The second comparator CA2 compares a circuit grounding voltage GND2 with a voltage GND2Cell of the second battery cell stack CE2. If the circuit grounding voltage GND2 is greater, the second comparator CA2 generates a minus voltage, while, if the voltage GND2Cell of the second battery cell stack CE2 is greater, the second comparator CA2 generates a plus voltage.

The first comparator CA1 compares an output voltage Vcs2 of the second cell stack CE2 with a circuit voltage VDD2. If the circuit voltage VDD2 is greater, the first comparator CA1 generates a plus voltage, while, if the output voltage Vcs2 of the second battery cell stack CE2 is greater, the second comparator CA1 generates a minus voltage.

The first and second adders AD1, AD2 add an offset voltage to control an operation point for a voltage-controlling current source P1 by the outputs of the first and second comparators CA1, CA2, and then outputs it.

Output terminals of the first and second adders AD1, AD2 are connected with each other. Thus, outputs of the first and second adders AD1, AD2 are piled up and then input to the voltage-controlling current source P1 as a control voltage of the voltage-controlling current source P1.

Figure 3:
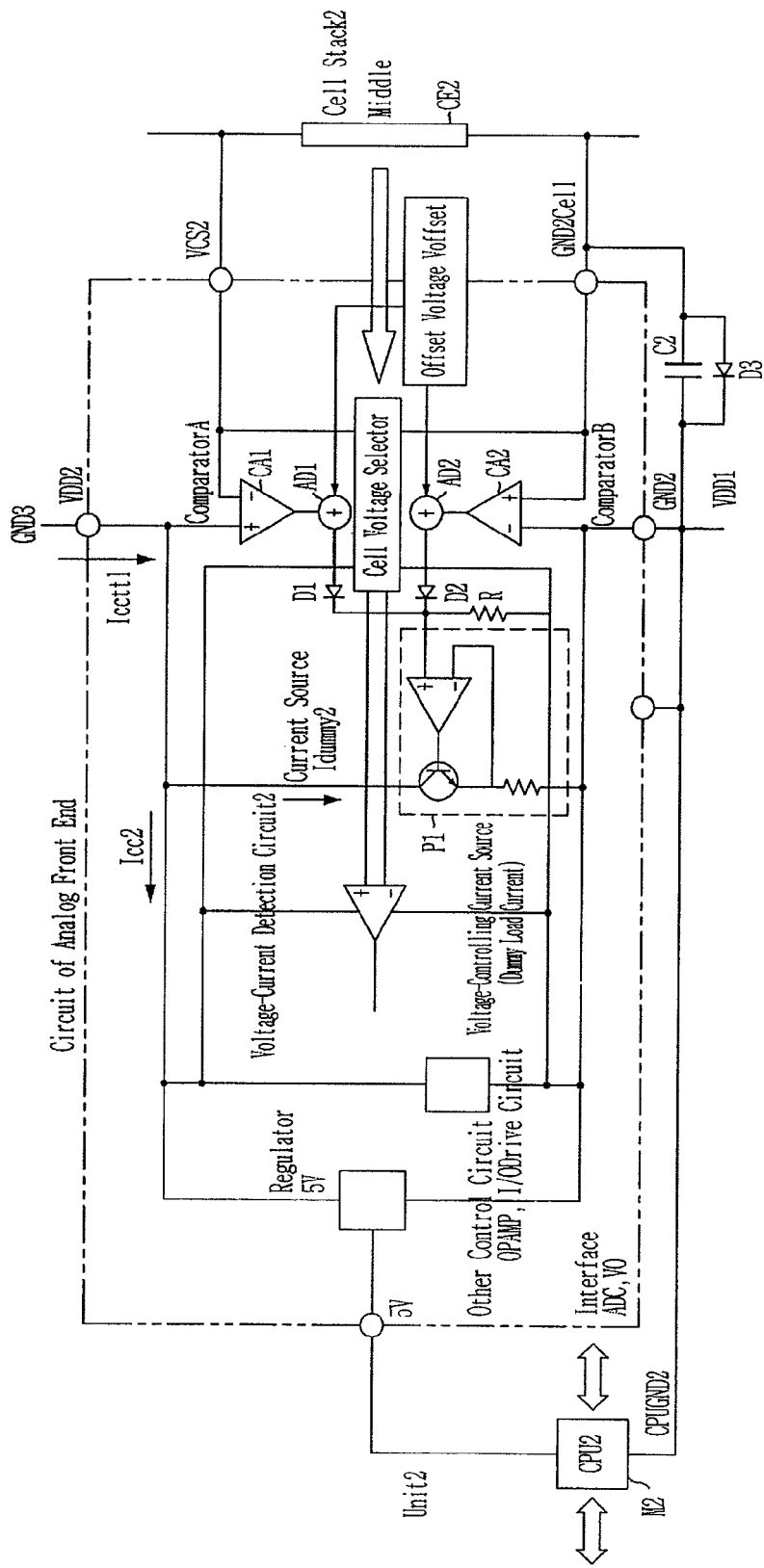
FIG. 3 shows a circuit current balancing apparatus according to a preferred embodiment of the present invention.
Figure 4:
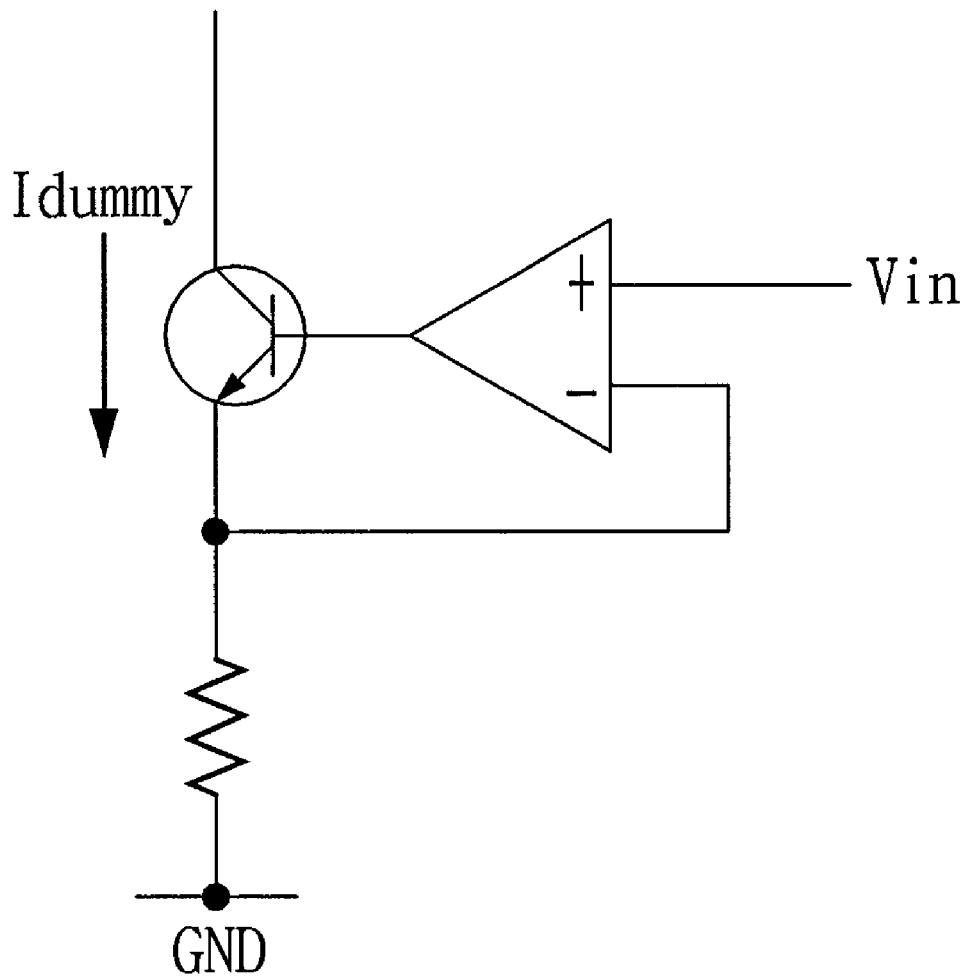
FIGS. 4 and 5 show a voltage-controlling current source.
Figure 5:
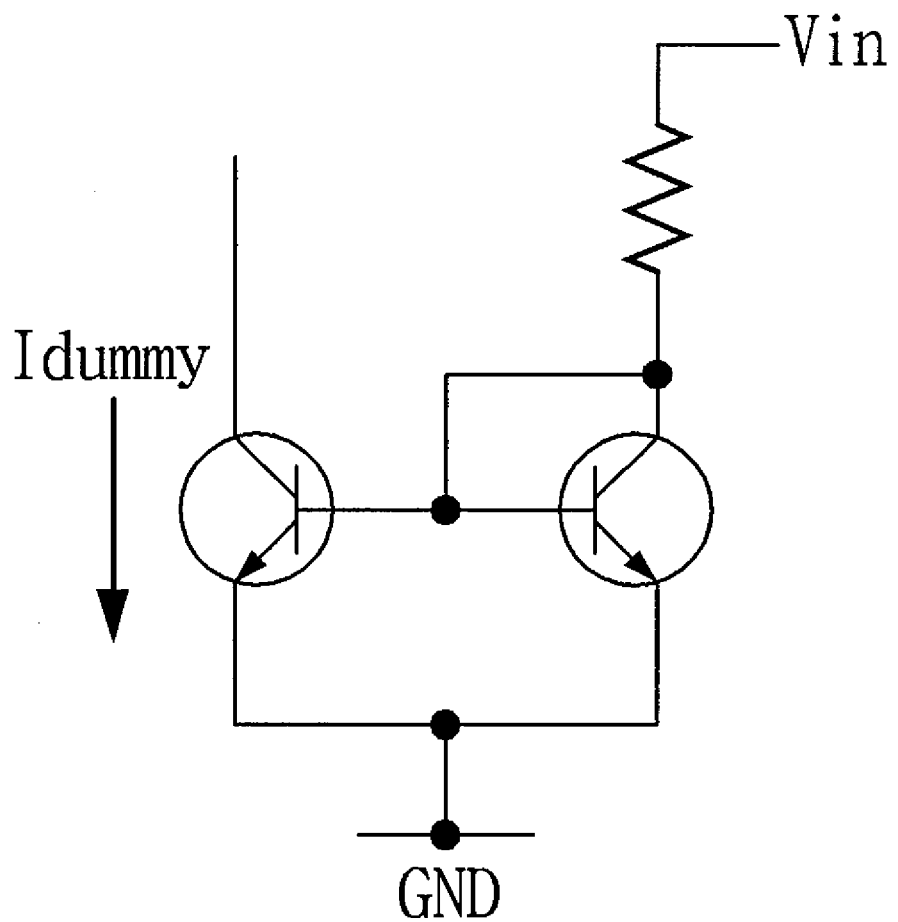

The voltage-controlling current source P1 receives the control voltage obtained by adding the outputs of the first and second adders AD1, AD2, and then outputs a current Idummy2 corresponding to the control voltage. The voltage-controlling current source P1 may be configured as shown in FIGS. 3 and 4. The configurations of the voltage-controlling current source P1 shown in FIGS. 3 and 4 are well known in the art and not described in detail here.

The outputs of the first and second adders AD1, AD2 are connected through diodes D1, D2, respectively, and the connection terminal is grounded through a resistance R. The diodes D1, D2 and the resistance R are used for stabilizing the outputs of the first and second adders AD1, AD2.

In addition, a capacitor C2 connected between the second battery cell stack CE2 and the circuit grounding GND2 is inserted for stabilizing a feedback loop and limiting frequency characteristics.

Also, a diode D3 connected between the second battery cell stack CE2 and the circuit grounding GND2 is inserted for limiting a minus voltage, in case the circuit grounding GND2 becomes an excessive minus voltage in controlling a dummy current. Here, the diode D3 is not operated when the circuit of the present invention flowing a dummy current is normally operated.

In addition, if the dummy current Idummy is small, the circuit current balancing apparatus of the present invention may realize a desired function by mounting only one of the first and second comparators CA1, CA2.

Figure 6:
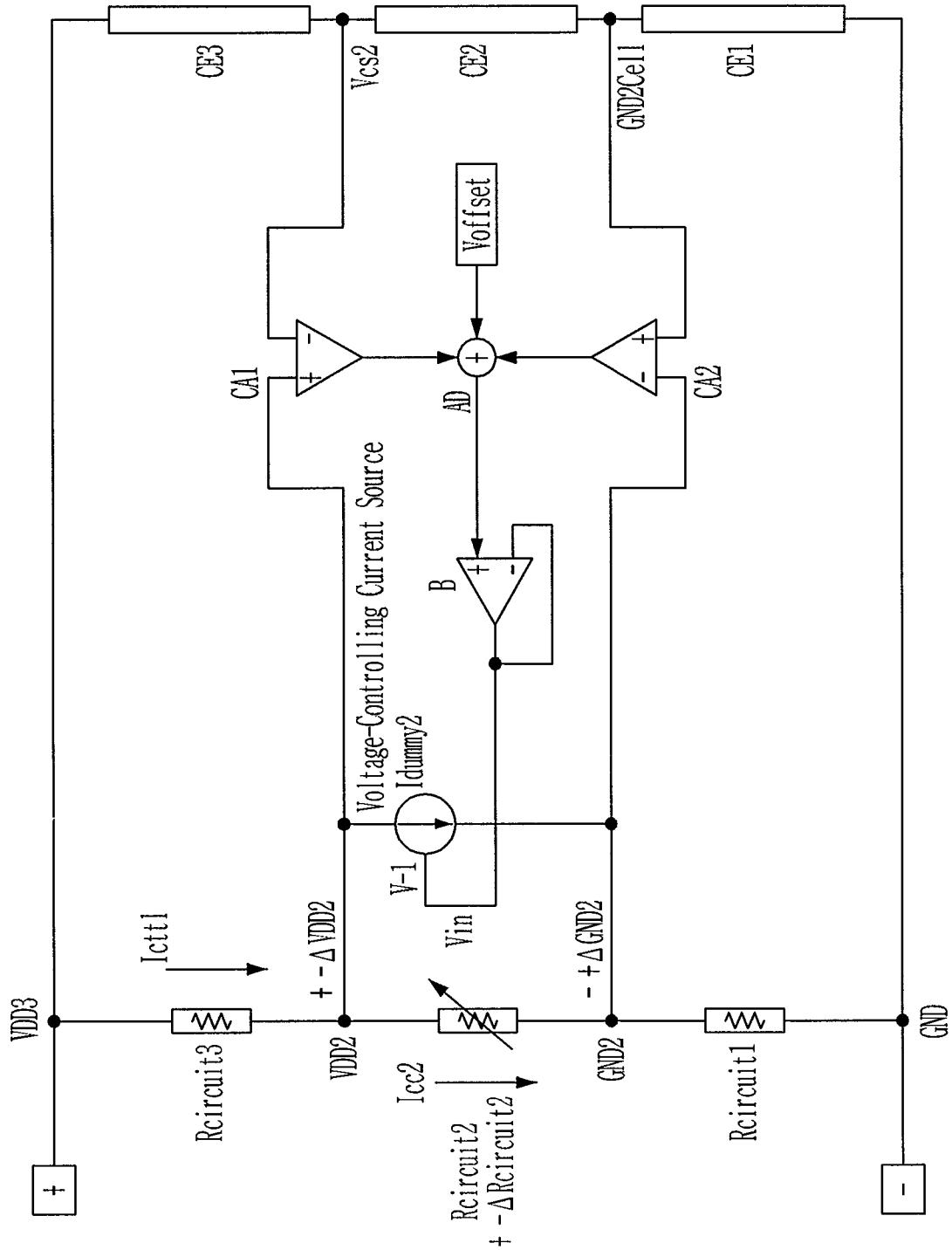
FIG. 6 exemplarily shows how the circuit current balancing apparatus according to the preferred embodiment of the present invention is operated.

Now, operations of the circuit current balancing apparatus according to the preferred embodiment of the present invention will be explained in detail with reference to FIG. 6. Here, only the circuit current balancing apparatus provided to the analog preprocessing circuit connected to the second battery cell stack CE2 will be explained as an example, for convenience.

First, it is assumed that voltages at Vcs2 and GND2Cell, acting as connection points of the second battery cell stack CE2, are not changed.

Assuming that Idummy1+Icc1=Idummy2+Icc2=Idummyn+Iccn=Icctt1 at an initial status of the circuit, Vcs2 is equal to VDD2, and GND2Cell is also equal to GND2.

Here, first to third resistances Rcircuit1, Rcircuit2, Rcircuit3 show resistance components of the analog preprocessing circuit of each unit. At this time, it is assumed that, among the resistances, only the second resistance Rcircuit2 changes by + or −ΔRcircuit2 due to the operation status, and the first and third resistances Rcircuit2, Rcircuit3 are not changed at fixed values.

In this state, if the second resistance Rcircuit2 changes by +ΔRcircuit2 to decrease Icc2, the voltage VDD2 may change by +ΔVDD2, and the voltage GND2 may change by −ΔGND2.

At this time, since the voltage Vcs2 of the second cell stack CE2 and the grounding GND2Cell are fixed, the first and second comparators CA1, CA2 generate +error output.

In order to adjust an operation point, the adder AD adds an offset voltage to the outputs of the first and second comparators CA1, CA2 and then outputs it. Here, the adder AD may add an offset voltage to the outputs of the first and second comparators CA1, CA2, respectively, and then add the results again, as in the example of FIG. 3, or it may add the offset voltage and the outputs of the first and second comparators CA1, CA2.

The control voltage output from the adder AD is provided to the voltage-controlling current source P1 through a buffer B. In the voltage-controlling current source P1, if the output voltage of the adder AD is + (plus), Idummy2 is increased to change (or, lower) the voltage ADD2 in − (minus) direction and change (or, raise) the voltage GND2 in + (plus) direction. Thus, a negative feedback loop for controlling VDD2 constantly is configured.

Differently from the above, the second resistance Rcircuit2 may change by −ΔRcircuit2 such that Icc2 is decreased, the voltage VDD2 may change by −ΔVDD2, and the voltage GND2 may change by +ΔGND2.

At this time, since the voltage Vsc2 of the second cell stack CE2 and the grounding GND2Cell are fixed, the first and second comparators CA1, CA2 output −error. The adder AD adds an offset voltage to the outputs of the first and second comparators CA1, CA2 and outputs it.

The output voltage of the adder AD is provided to the voltage-controlling current source P1 via the buffer B. In the voltage-controlling current source P1, if the output of the adder AD is − (minus), Idummy2 is decreased to change (or, raise) the voltage VDD2 in + (plus) direction and change (or, lower) the voltage GND2 in − (minus) direction. Thus, a negative feedback loop for controlling VDD2 constantly is configured.

If a circuit consumption current of Iccn changes from 0 mA to 5 mA, the voltage-controlling current source of the present invention is preferably adopted to cover the changing range.

Also, the offset voltage provided for adjusting the operation point may be set in the following two ways.

First, a small offset voltage may be set to allow the change of voltages ΔVDD2 and ΔGND2 to some extent when balancing current. In this case, Idummy is not always flowing, so this way may restrain current consumption to a low level.

Second, a large offset voltage may be set to keep the voltages ΔVDD2 and ΔGND2 constantly when balancing current. In this case, Idummy is always flowing, so it is possible to maintain the conditions VDD2=Vcs2, GND2=GND2Cell though current consumption is increased.

Industrial Applicability

As described above, the apparatus of the present invention balances circuit currents of units of a battery device such that a plurality of battery cells provided in the battery device may be all fully charged. In addition, the apparatus of the present invention prevents deterioration of battery cells in advance, and adds or subtracts a dummy current to/from the circuit current of each unit of a battery device such that circuit currents of units are balanced identically.

The present invention has been described in detail. However, it should be understood that the detailed description and specific examples, while indicating preferred embodiments of the invention, are given by way of illustration only, since various changes and modifications within the spirit and scope of the invention will become apparent to those skilled in the art from this detailed description.

The invention claimed is:

1. A circuit current balancing apparatus of a battery device provided with a plurality of cell stacks respectively composed of at least one cell, the apparatus balancing a circuit current flowing in a circuit connected to each of the plurality of cell stacks, the apparatus comprising:
    a comparator for comparing an output voltage of the corresponding cell stack with a voltage of the circuit connected to the corresponding cell stack; and
    a current source for adding or subtracting a dummy current to/from a circuit current flowing in the circuit in correspondence with the output of the comparator such that the circuit current is balanced with a circuit current flowing in an adjacent control circuit.

2. The circuit current balancing apparatus of a battery device according to claim 1, further comprising:
    an adder for adding a predetermined offset voltage to the output of the comparator and then providing the added result to the current source.

3. The circuit current balancing apparatus of a battery device according to claim 1, wherein the comparator includes:
    a first comparator for comparing any one of voltages at both ends of the cell stack with any one of voltages at both ends of the circuit;
    a second comparator for comparing the other one of voltages at both ends of the cell stack with the other one of voltages at both ends of the circuit; and
    an adder for adding outputs of the first and second comparators and then providing the added result to the current source.

4. The circuit current balancing apparatus of a battery device according to claim 3, wherein the adder executes:
    adding a predetermined offset voltage to the output of the first comparator;
    adding a predetermined offset voltage to the output of the second comparator; and
    adding the added results again.

5. The circuit current balancing apparatus of a battery device according to claim 3, wherein the adder adds the output of the first comparator, the output of the second comparator, and a predetermined offset voltage.

6. A circuit current balancing method of a battery device provided with a plurality of cell stacks respectively composed of at least one cell, the apparatus balancing a circuit current flowing in a circuit connected to each of the plurality of cell stacks, the method comprising:
    comparing an output voltage of the corresponding cell stack with a voltage of the circuit connected to the corresponding cell stack; and adding or subtracting a dummy current to/from a circuit current flowing in the circuit in correspondence with the output such that the circuit current is balanced with a circuit current flowing in an adjacent control circuit.

7. The circuit current balancing method of a battery device according to claim 6, further comprising:

adding a predetermined offset voltage to the output to adjust an operation point at which the dummy current is generated.

8. The circuit current balancing method of a battery device according to claim 6, wherein the comparing step includes:

comparing any one of voltages at both ends of the cell stack with any one of voltages at both ends of the circuit;

comparing the other one of voltages at both ends of the cell stack with the other one of voltages at both ends of the circuit; and adding both comparison results and then outputting the added result as a final comparison result.

9. The circuit current balancing method of a battery device according to claim 8, wherein the comparing step adds a predetermined offset voltage to each of the comparison results, adds both added results, and then outputs the re-added result as a final comparison result.

10. The circuit current balancing method of a battery device according to claim 8, wherein the comparing step adds both comparison results and a predetermined offset voltage and outputs the added result as a final comparison result.

* * * * *